US011358814B2

(12) United States Patent
Yoder et al.

(10) Patent No.: US 11,358,814 B2
(45) Date of Patent: Jun. 14, 2022

(54) SYSTEMS AND METHODS FOR PREPARING DRY PROCESS MATERIALS AND REDUCING RESPIRABLE DUST

(71) Applicant: ExxonMobil Technology and Engineering Company, Annandale, NJ (US)

(72) Inventors: Patrick L. Yoder, Montgomery, TX (US); Christopher J. Fowler, Houston, TX (US); Aaron M. Schlett, Conroe, TX (US); Laura E. Johnsen, Spring, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 16/709,998

(22) Filed: Dec. 11, 2019

(65) Prior Publication Data
US 2020/0207560 A1    Jul. 2, 2020

Related U.S. Application Data

(60) Provisional application No. 62/784,899, filed on Dec. 26, 2018.

(51) Int. Cl.
*B65G 69/18*    (2006.01)

(52) U.S. Cl.
CPC ...... *B65G 69/183* (2013.01); *B65G 2201/042* (2013.01)

(58) Field of Classification Search
CPC ........ B65G 53/06; B65G 53/32; B65G 53/42; B65G 53/48; B65G 53/52; B65G 2201/04;
(Continued)

(56) References Cited

U.S. PATENT DOCUMENTS

| 1,655,558 A | * | 1/1928 | Meyer | F27D 1/1642 |
| | | | | 406/71 |
| 1,684,370 A | * | 9/1928 | Schuster | B65G 53/32 |
| | | | | 366/5 |

(Continued)

FOREIGN PATENT DOCUMENTS

| CN | 104002383 A | 8/2014 |
| EA | 021969 B1 | 10/2015 |

(Continued)

OTHER PUBLICATIONS

The International Search Report and Written Opinion for PCT/US2019/065582 dated Apr. 7, 2020.

*Primary Examiner* — Joseph A Dillon, Jr.
(74) *Attorney, Agent, or Firm* — Vorys, Sater, Seymour and Pease LLP

(57) ABSTRACT

A system for preparing a dry process material includes a sealed container that holds and seals the dry process material therein and prevents airborne dust or particles from the dry process material from escaping the sealed container. Sealed processing equipment receives the dry process material from the sealed container and prevents the airborne dust or particles from escaping the sealed processing equipment. A sealed connection sealingly couples the sealed container to the sealed processing equipment and prevents the airborne dust or particles from escaping while transferring the dry process material. A sealed transfer conduit is sealingly coupled to and extends from the sealed processing equipment.

8 Claims, 3 Drawing Sheets

(58) Field of Classification Search
CPC ........ B65G 2201/042; B65G 2201/045; B65G 69/18; B65G 69/181; B65G 69/182; B65G 69/183; B65D 88/548; B65D 90/30; E04F 21/12; B01F 15/028; F27D 1/1636; F27D 1/1642; F27D 1/1668; C04B 40/0028; C04B 40/006; C04B 40/0064; C04B 2111/00155; C04B 2111/00163; C04B 2111/00431; C04B 2111/0057
USPC ....... 406/124, 125, 126, 134, 135, 136, 137, 406/138, 146, 194, 197; 414/291
See application file for complete search history.

(56) References Cited

U.S. PATENT DOCUMENTS

| | | | | | |
|---|---|---|---|---|---|
| 1,718,507 | A * | 6/1929 | Wenzel | ................. | B05B 7/1404 427/196 |
| 1,883,218 | A * | 10/1932 | Wohlenberg | ............. | F23K 1/00 241/5 |
| 1,911,514 | A * | 5/1933 | Kernan | ................. | B65G 53/32 406/88 |
| 2,534,270 | A * | 12/1950 | Kemper | ................. | B65G 53/32 406/131 |
| 3,012,732 | A * | 12/1961 | Kempthorne | ........... | E04F 21/12 239/300 |
| 3,305,140 | A * | 2/1967 | Johnson | ................ | B05B 7/1486 406/24 |
| 3,385,634 | A * | 5/1968 | Vigyazo | ................ | B65G 53/00 406/126 |
| 3,411,832 | A * | 11/1968 | Garreau | ................. | B05B 7/144 406/52 |
| 3,429,554 | A * | 2/1969 | Pro | ....................... | F16K 1/2028 251/175 |
| 3,644,003 | A * | 2/1972 | Von Funk | ............ | B65G 53/00 406/126 |
| 3,758,034 | A * | 9/1973 | Broadfoot | ............. | A62C 35/66 239/9 |
| 3,768,867 | A * | 10/1973 | Krambrock | ............ | B65G 53/66 406/126 |
| 3,918,749 | A * | 11/1975 | Taylor | .................... | B65G 53/32 285/256 |
| 4,440,499 | A * | 4/1984 | Tomikawa | .............. | B28C 5/123 366/10 |
| 4,492,478 | A * | 1/1985 | Ito | ....................... | B28B 19/0023 366/134 |
| 4,883,390 | A * | 11/1989 | Reintjes | ................ | B65G 53/12 406/24 |
| 4,931,098 | A * | 6/1990 | Danielssen | ............... | B28B 1/32 106/638 |
| 5,104,696 | A * | 4/1992 | Waisnix | ................ | B05B 7/1436 427/345 |
| 5,195,851 | A * | 3/1993 | Shepard | ............... | B65G 69/182 406/121 |
| 5,976,632 | A * | 11/1999 | Gerber | .................. | B05B 7/1431 427/426 |
| 6,230,809 | B1 * | 5/2001 | Korsgaard | ............ | B63B 22/026 166/352 |
| 6,283,680 | B1 * | 9/2001 | Vidal | .................... | B65G 53/32 406/128 |
| 6,994,497 | B1 * | 2/2006 | Eriksson | ................ | B01J 8/0005 406/124 |
| 7,476,265 | B2 * | 1/2009 | Firman | ................ | B65G 69/182 55/385.1 |
| 2006/0243747 | A1 * | 11/2006 | Dackefjord | ......... | F04B 43/1215 222/254 |
| 2007/0012809 | A1 * | 1/2007 | Fellinger | ................. | F16L 11/18 241/57 |
| 2008/0008562 | A1 * | 1/2008 | Beckel | .................... | E21B 21/01 414/133 |
| 2017/0073269 | A1 * | 3/2017 | Camali | ................. | B28C 9/0463 |

FOREIGN PATENT DOCUMENTS

EP 0922550 A1 6/1999
WO 2010/026235 A1 3/2010

* cited by examiner

SYSTEMS AND METHODS FOR PREPARING DRY PROCESS MATERIALS AND REDUCING RESPIRABLE DUST

CROSS REFERENCE TO RELATED APPLICATION

This application relates and claims priority to U.S. Provisional Application No. 62/784,899, filed on Dec. 26, 2018, the disclosure of which is incorporated specifically herein by reference in its entirety.

BACKGROUND

Concrete and mortar mixtures, including refractory materials, can be applied onto a receiving surface through a process sometimes referred to as "shotcreting," which can include both wet-mix and dry-mix applications. In wet-mix applications, a dry process material is loaded into a mixer or hopper and a liquid (e.g., water) is added to create a slurry, which is then conveyed through a hose to a nozzle. At the nozzle, the slurry is discharged at a high velocity onto an adjacent receiving surface, and in some cases an accelerant is added at the nozzle to help aid the slurry in adhering to the receiving surface. Alternatively, the slurry can be deposited at low velocity into forms to generate "castables." In dry-mix applications, also referred to as "pneumatic gunning," the dry process material is introduced into the hopper and conveyed pneumatically through the hose to the nozzle. Upon discharge from the hose at the nozzle, a liquid (e.g., water) is added to the dry process material and a mixture of the two is pneumatically projected onto the receiving surface at high velocity.

The dry process materials are commonly packaged in plastic, paper, or fabric bags that must be opened or broken to feed the materials into the hopper. Transporting and opening the bags, and subsequently depositing the materials into the hopper, can generate large amounts of airborne and respirable dust and particles. The Occupational Safety and Health Administration (OSHA) has deemed airborne dust and particles, especially crystalline silica commonly found in refractory materials, harmful to human personnel (i.e., workers) if breathed in. To protect worker health, some companies have implemented engineered controls that contain airborne dust in isolated areas, such as enclosed structures used specifically for the preparation and mixing of dry process materials, and installing fresh air blowers and filtration systems in such enclosed structures. Nonetheless, worker exposure to respirable materials is not thereby completely eliminated. Consequently, workers also often wear personal protection equipment (PPE), such as respirators with dust filtration, which helps lower potential exposure. PPE, however, does not entirely eliminate the risk and is commonly a last line of protection.

There is a need driven by safety concerns for reducing or eliminating respirable dust during dry process material preparation, such as the preparation of refractory materials, including the transport, mixing, and other steps associated with monolithic refractory installation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DESCRIPTION

Figure 1:
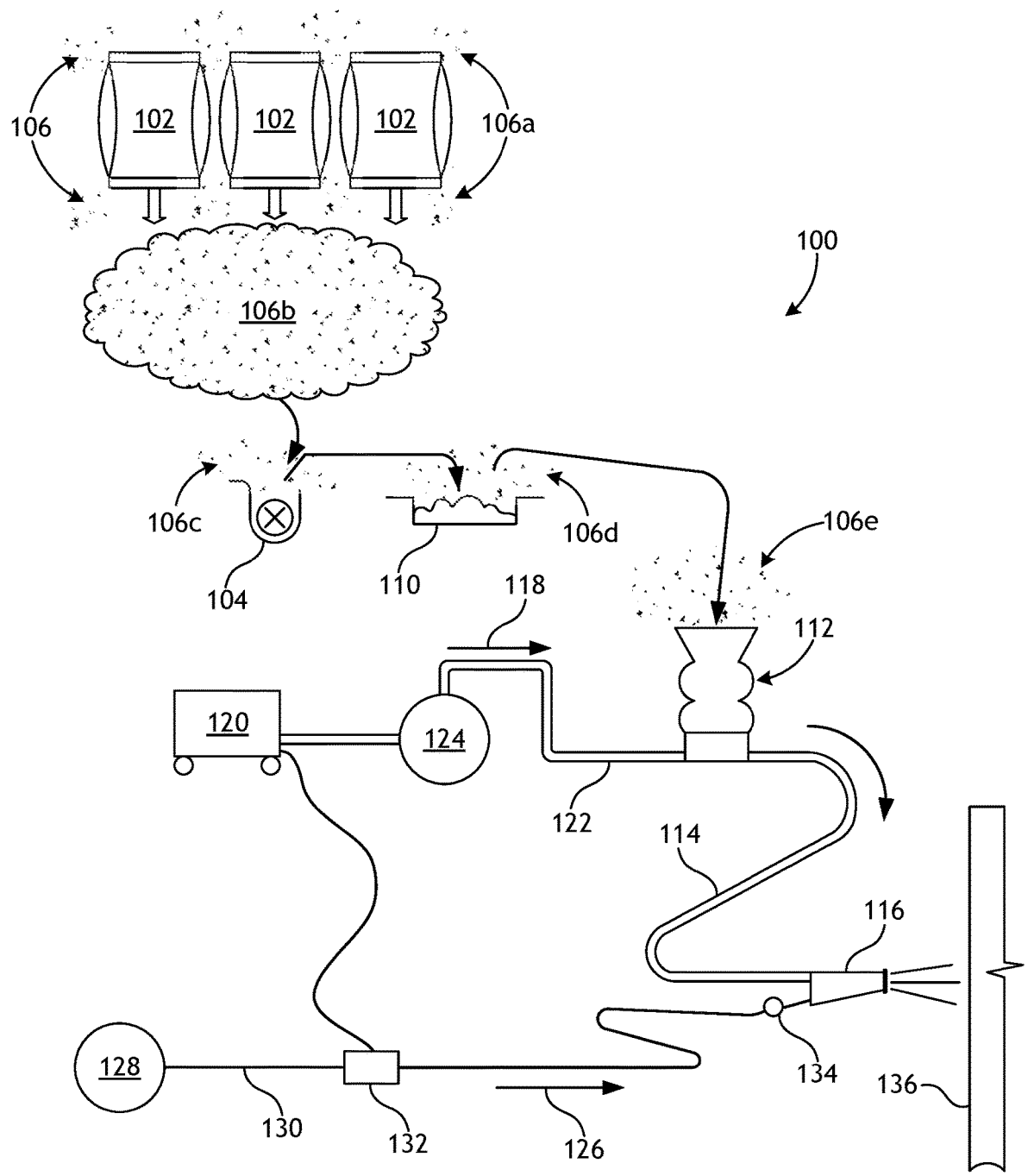
FIG. 1 is a schematic diagram of a prior art system for preparing a dry process material.

The present disclosure is related to dry process material processing and, more particularly, to systems and methods of processing the dry process materials that provide sealed enclosures and connections to reduce or eliminate airborne dust or particles.

The embodiments discussed herein describe a refractory transport and mixing system designed to reduce or eliminate airborne dust associated with refractory preparation. The disclosed systems and methods provide sealed enclosures during the process of transport and mixing. The refractory material, for example, may be shipped in packaging that contains and seals the material therein until transferred to adjacent processing equipment, such as a mixer or a hopper. The processing equipment may also be sealed and self-contained to prevent airborne dust generated by mechanical energy (e.g., churning, mixing, agitating, etc. of the materials). The prepared material may be transported in hoses, pipes, or in a similar contained manner to the location that the refractory is to be installed generally by gunite, shotcrete, or casting. Accordingly, during the various steps of the refractory material preparation, the refractory and associated airborne dust is contained, thus reducing or eliminating workers to exposure of airborne particles deemed harmful.

One example system for preparing a dry process material (e.g., a refractory material) includes a sealed container that holds and seals the dry process material therein and prevents airborne dust or particles from the dry process material from escaping the sealed container. Sealed processing equipment may receive the dry process material from the sealed container and prevent the airborne dust or particles from escaping the sealed processing equipment. A sealed connection may sealingly couple the sealed container to the sealed processing equipment and may prevent the airborne dust or particles from escaping while transferring the dry process material. A sealed transfer conduit may be sealingly coupled to and extend from the sealed processing equipment to discharge the material as desired.

As used herein the term "dry process material" refers to any powdered or aerosolizable material or substance, which may comprise fine solid particles, particulates, grains, and/or flakes, or a mixture thereof, that can be suspended in a gaseous medium (e.g., air) upon being agitated or assuming mechanical energy. Example dry process materials include, but are not limited to, concrete mixtures, mortar mixtures, and refractory grains and materials, each of which may include a bonding agent and generate or emit airborne dust or particles during transport, processing, and application. The presently disclosed systems and methods mitigate or eliminate airborne dust or particles during transport, processing, and application of the dry process material, thus enhancing safety of human personnel. In particular, the presently disclosed systems and methods may be useful in mitigating or eliminating airborne dust or particles generated by refractory materials during transport, processing, and application.

It is noted, however, that the principles of the present disclosure are equally applicable to other types of dry process materials used in other industries or applications. For example, the principles described herein may be equally applicable to dry process materials such as, but not limited to, food products, fertilizers, sand, cosmetic powders, minerals (e.g., mineral processing), metals (e.g., metal fabrication and processing), grains, ceramic materials (e.g., ceramics processing), or any combination thereof. Accordingly, while the embodiments described herein are directed primarily to dry process materials in the form of refractory materials, this should not be considered limiting to the scope of the disclosure.

FIG. 1 is a schematic diagram of a prior art system 100 for preparing a dry process material. The system 100 as depicted is generally designed for dry-mix applications, but may be modified to alternatively accommodate wet-mix applications. As illustrated, one or more bags 102 (three shown) of the dry process material may be transported and delivered to a job site where a mixer 104 is located. The bags 102 may be constructed of paper, plastic, fabric, or a combination thereof, and can range in size from 25 lbs. to more than 2,000 lbs., but are not limited to those sizes. During transport to the job site, the bags 102 may be closed but are not entirely sealed and, as a result, dust and other airborne particles 106a may be emitted or otherwise escape from the bags 102 during movements (jostling) associated with transport and storage.

The dry process materials are introduced into the mixer 104 by opening or otherwise breaking the bags 102 and depositing the dry process materials therein. This process generates a large amount of additional airborne dust and particles 106b. Moreover, mixing the dry process materials in the mixer 104 can also generate airborne dust and particles 106c as the dry process materials are progressively churned and agitated (e.g., assuming mechanical energy). After mixing in the mixer 104, if needed, the dry process materials may be conveyed to or otherwise deposited within a holding bin or hopper 110, which can also generate additional airborne dust and particles 106d. In some applications, the mixer 104 and the hopper 110 are combined as a single structure or piece of equipment. From the hopper 110, the dry process materials are conveyed to or otherwise deposited within a gunning machine 112, which process may also generate additional airborne dust and particles 106e.

The gunning machine includes a hose 114 that terminates at a nozzle 116. In dry-mix applications, the dry process materials are conveyed through the hose 114 pneumatically with compressed air 118 injected into the hose 114 with a compressor 120 via an interconnected air line 122. In some cases, a knock down drum 124 is arranged in the air line 122 to remove liquids from the compressed air 118.

A liquid 126, such as water, is supplied to the nozzle 116 from a water source 128 and pumped through a water line 130 using a booster pump 132. A valve 134 is arranged in the water line 130 at or near the nozzle 116 to allow a worker to regulate the amount of liquid 126 introduced into the nozzle 116. The dry process materials and the liquid 126 are pneumatically discharged from the nozzle 116 at high velocity to be applied as a mixture onto an adjacent receiving surface 136.

In wet-mix applications, the liquid 126 can be added to the dry process materials at the mixer 104 (or a combination of the mixer 104 and the hopper 110) such that a slurry is pumped to the nozzle 116. The slurry can either be discharged from the nozzle 116 at a high velocity to be applied on the adjacent receiving surface 136, or at low velocity and deposited into one or more forms to form corresponding "castables." In some cases, an accelerant can be added to the slurry at the nozzle to aid the slurry in adhering to the receiving surface 136.

The airborne dust 106a-e generated during the various steps of transporting and processing the dry process materials can be dangerous to human personnel or workers upon respiration. In applications where the dry process materials comprise refractory materials, the airborne dust 106a-e can be particularly dangerous as it will commonly include refractory fibers and crystalline silica particles ranging in size from submicron to about 0.5 inches. In accordance with permissible exposure limits (PEL) required by the Occupational Safety and Health Administration (OSHA), the airborne dust 106a-e must be controlled to acceptable limits. Engineered controls, such as enclosed structures, fresh air and filtration systems, and personal protection equipment (e.g., respirator systems and masks), can help lower potential exposure to workers, but such preventative measures do not entirely eliminate the risk.

Embodiments of the present disclosure include systems and methods that reduce or eliminate airborne dusts and particles associated with the transport, mixing, and conveying of dry process materials, such as refractory materials. The systems and methods disclosed herein describe a self-enclosed system that safely reduces the amount of dust becoming airborne to levels deemed acceptable by OHSA. For example, on 25 Mar. 2016, OSHA published its new rules concerning specific health standards for crystalline silica, which took effect on 23 Jun. 2016. The rule established a PEL of 0.05 mg/m$^3$, 8-hour total weight average (TWA) (50 µg/m$^3$, 8-hour TWA), as well as an Action Level (a defined concentration level that necessitates certain required actions) of 0.025 mg/m$^3$, 8-hour TWA (25 µg/m$^3$, 8-hour TWA) regardless of the percent and form of crystalline silica. The systems and methods disclosed herein are configured to meet and/or exceed this OSHA requirement.

Figure 2:
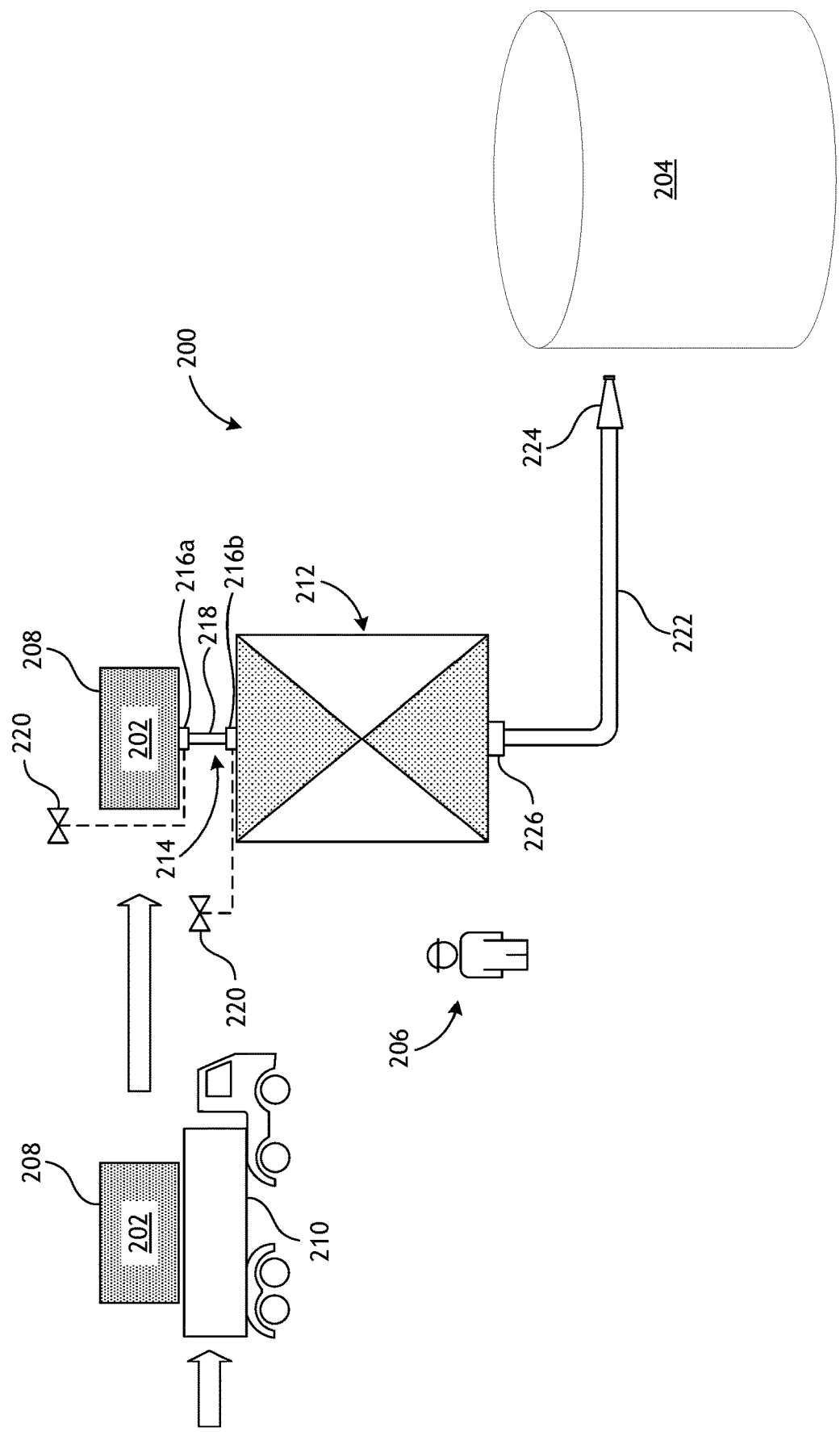
FIG. 2 is a schematic diagram of an example system for preparing a dry process material, according to one or more embodiments of the present disclosure.

FIG. 2 is a schematic diagram of an example system 200 for preparing a dry process material 202, according to one or more embodiments of the present disclosure. The system 200 may be used to prepare the dry process material 202 in dry-mix or wet-mix applications. The dry process material 202 may comprise any of the aerosolizable materials or substances mentioned herein. For purposes of the present discussion, however, the dry process material 202 comprises a refractory material, and the system 200 may be used to prepare the refractory material to be applied on equipment 204 requiring a refractory lining. The equipment 204 may comprise, for example, a fired heater, a thermal processing unit (e.g., fluid catalytic cracking unit or "FCCU"), a reactor vessel, a regenerator, a stack, a process vessel, a pressure vessel, a furnace, a conduit or line (e.g., catalyst transfer line or pipe), an incinerator, a boiler, a fired heater, or any combination thereof. As will be appreciated, the principles of the present disclosure are not limited to chemicals and refineries, but may also be applicable to all industries that use refractory lined equipment. Example industries that may also benefit from this disclosure include, but are not limited to, iron and steel manufacturing, ferrous and nonferrous metal manufacturing, glass manufacturing, cement and lime manufacturing, and any combination thereof.

The system 200 may include a plurality of sealed components and/or equipment that mitigate or eliminate the generation of airborne dust and particles from the refractory materials. More specifically, during the various steps of refractory material preparation throughout the system 200, the refractory and associated airborne dust is contained, thus reducing or eliminating exposure to a worker 206 (e.g., human personnel). As illustrated, the system 200 may include a sealed container 208, and the dry process material 202 may be packaged and stored within the sealed container 208. The sealed container 208 may be transported to a job site using a truck 210 or another type of transport vehicle. The sealed container 208 may provide or otherwise constitute a sealed enclosure, such as a bag or a vessel, which prevents dust or particulates from the dry process material 202 from escaping during storage and transport.

In some embodiments, the manufacturer of the dry process material 202 may provide the sealed container 208 and seals the dry process material 202 therein. In other embodiments, however, a third party may provide the sealed container 208 and/or seal the dry process material 202 therein, without departing from the scope of the disclosure.

The sealed container 208 may be made of a variety of impermeable materials including, but not limited to, a plastic, a metal, a fabric, an elastomer, a composite material (e.g., fiberglass, carbon fiber, etc.), silicone, graphite, paper, cardboard, or any combination thereof.

In at least one embodiment, the sealed container 208 may be hermetically sealed such that no gases or substances are permitted to migrate into or out of the sealed container 208. In such embodiments, the material for the sealed container 208 may be welded shut, e.g., sonically or ultrasonically welded for plastic materials, or metal welded for metal materials. In other embodiments, one or more seals or gaskets may be used to seal interfaces between opposing members of the sealed container 208, thus rendering the sealed container 208 impermeable. In embodiments where the sealed container 208 comprises a fabric material, the fabric may be sealed on inner or outer surfaces with a polymer or elastic liner that prevents dust or particulate migration. Alternatively, the thread count of the fabric may be large enough to prevent dust or particulates of a predetermined size from escaping through the fabric material.

At the job site, the dry process material 202 may be introduced into sealed processing equipment 212 via a sealed connection 214. In general, the sealed connection 214 facilitates the transfer of the dry process material 202 from the sealed container 208 into the sealed processing equipment 212, and may provide sealed interfaces such that airborne dust or particulates from the dry process material 202 are largely prevented from escaping into the surrounding environment and thereby affecting the worker 206.

In some embodiments, the sealed connection 214 may include a first sealed coupling 216a, a second sealed coupling 216b, and a sealed conduit 218 extendable between the first and second sealed couplings 216a,b. As illustrated, the first sealed coupling 216a may be secured to or otherwise form part of the sealed container 208, and the second sealed coupling 216b may be secured to or otherwise form part of the sealed processing equipment 212. The sealed conduit 218 may be sealingly coupled at each end to the sealed couplings 216a,b and used to transfer the dry process material 202 between the sealed container 208 and the sealed processing equipment 212. The sealed conduit 218 may be, but is not limited to, a hose, a pipe, a chute, a funnel, a conveyor belt, an auger, or any combination thereof.

The coupled engagement between the sealed couplings 216a,b and the sealed conduit 218 may result in a sealed interface (i.e., sealingly coupled) that prevents airborne dust or particulates from the dry process material 202 from escaping into the surrounding environment. In some embodiments, for example, one or both of the sealed couplings 216a,b and the sealed conduit 218 may include a gasket or seal (e.g., and O-ring seal) that seals the interface upon completing the coupled engagement. In other embodiments, the sealed conduit 218 may be mechanically sealed to one or both of the sealed couplings 216a,b, such as via a mechanical lock down, a squeeze lever, a clamp fitting, a threaded connection, a Chicago fitting, or any combination thereof. In yet other embodiments, the sealed conduit 218 may be sealed to one or both of the sealed couplings 216a,b via an interference or friction fit, without departing from the scope of the disclosure.

In some embodiments, fluid communication between the sealed container 208 and the sealed processing equipment 212 is facilitated upon coupling the sealed conduit 218 to each sealed coupling 216a,b. In other embodiments, however, one or both of the sealed couplings 216a,b may include or otherwise incorporate a valve 220 or another type of actuator that must first be actuated to initiate fluid communication through the sealed conduit 218.

In yet other embodiments, the sealed conduit 218 may be omitted from the sealed connection 214, and the first and second sealed couplings 216a,b may alternatively be configured to form a sealed and mated engagement between themselves. In such embodiments, the first sealed coupling 216a may be received by the second sealed coupling 216b (or vice versa) such that a mated and sealed interface is generated between the two components. The sealed engagement between the sealed couplings 216a,b may be facilitated by, but not limited to, a gasket or seal (e.g., and O-ring seal), a mechanical seal (e.g., a mechanical lock down, a squeeze lever, a clamp fitting, a threaded connection, etc.), an interference or friction fit, a Chicago fitting, or any combination thereof.

The dry process material 202 may be transferred mechanically, pneumatically, or by gravity between the sealed container 208 and the sealed processing equipment 212 and via the sealed connection 214. Mechanically transferring the dry process material 202 may comprise using an auger or the like to physically drive or pull the dry process material 202 out of the sealed container 208 and into the sealed processing equipment 212. Pneumatically transferring the dry process material 202 may comprise using compressed air to drive the dry process material 202 into the sealed processing equipment 212, or alternatively creating a vacuum that draws the dry process material 202 into the sealed processing equipment 212. Transferring the dry process material 202 using gravity may entail merely allowing the dry process material 202 to flow out of the sealed container and into the sealed processing equipment 212 under the force of gravity via the sealed connection 214.

The sealed processing equipment 212 may comprise one or more pieces of equipment used to mix, blend, or convey the dry process material 202. The sealed processing equipment 212 may include, but is not limited to, a mixer, a hopper, a pump, a gunning machine, one or more transfer lines, a holding tank, or any combination thereof. The sealed processing equipment 212 may be sealed and self-contained to prevent airborne dust or particulates arising from the dry process material 202. In some embodiments, for example, a combination of sealed gaskets may be mechanically tightened to achieve a friction fit aided by gravity against a corresponding seal and gasket combination. Additionally, piping and transfer piping may include sealed clamps to ensure sealed interfaces between adjacent equipment.

The system 200 may further include a sealed transfer conduit 222 extending from the sealed processing equipment 212. The sealed transfer conduit 222 may comprise hose or pipe that may be fluidly coupled at one end to the sealed processing equipment 212. In some embodiments, a nozzle 224 may be coupled to the opposite end of the sealed transfer conduit 222 and through which dry-mix or wet-mix materials may be discharged to be applied on the equipment 204.

In some embodiments, the sealed transfer conduit 222 may be fluidly and sealingly coupled to the sealed processing equipment 212 at a sealed coupling 226, which provides a sealed interface that prevents airborne dust or particulates from the dry process material 202 from escaping into the surrounding environment. In some embodiments, one or both of the sealed coupling 226 and the sealed transfer conduit 222 may include a gasket or seal (e.g., and O-ring seal) that seals the interface upon completing the coupled engagement. In other embodiments, the sealed transfer conduit 222 may be mechanically sealed to the sealed coupling 226, such as via a mechanical lock down, a squeeze lever, a clamp fitting, or a threaded engagement. In yet other embodiments, the sealed transfer conduit 222 may be sealed to the sealed coupling 226 via an interference or friction fit, without departing from the scope of the disclosure.

The material discharged from the sealed transfer conduit 222 may be dry or wet. If dry, the material may be combined with water or another liquid upon being discharged to form the mixture to be applied on the sprayed on the equipment 204. If wet, the material may be sprayed on the equipment 204 or deposited into one or more forms to form a corresponding one or more "castables."

Figure 3:
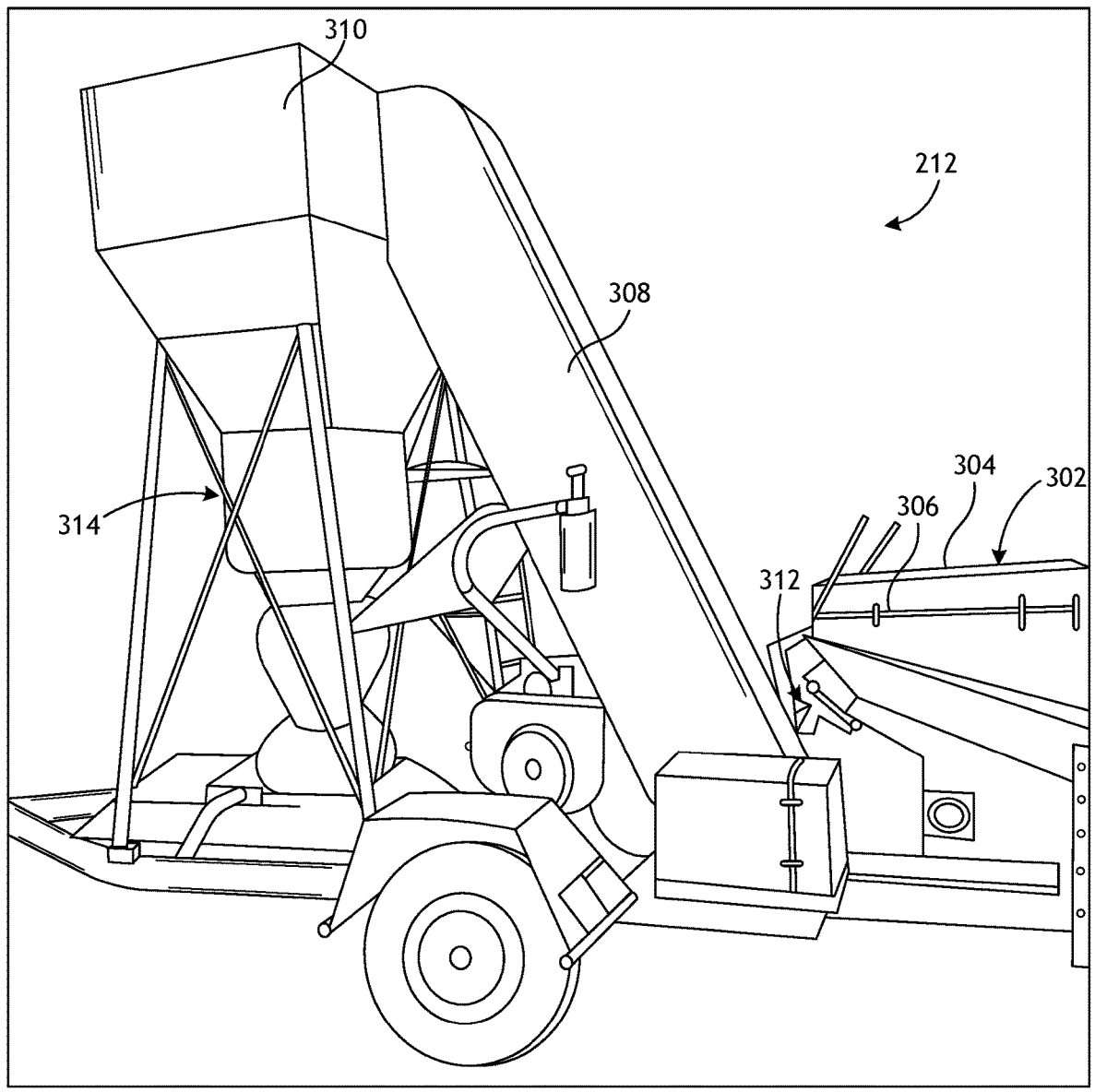
FIG. 3 is one example of the sealed processing equipment of FIG. 2, according to one or more embodiments.

FIG. 3 is one example of the sealed processing equipment 212 of FIG. 2, according to one or more embodiments. It is noted that the sealed processing equipment 212 of FIG. 3 is but one example of suitable sealed processing equipment that may be used in accordance with the principles of the present disclosure. Those skilled in the art will readily appreciate that various modifications to the sealed processing equipment 212 may be undertaken, without departing from the scope of the disclosure.

As indicated above, the sealed processing equipment 212 may comprise or include one or more pieces of equipment or machinery used to mix, blend, or convey the dry process material 202 (FIG. 2). Alternatively, or in addition thereto, the sealed processing equipment 212 may comprise a sealed enclosure or structure that substantially or wholly encapsulates the equipment or machinery used to mix, blend, or convey the dry process material 202. In either scenario, the sealed processing equipment 212 may be sealed and self-contained to prevent airborne dust or particulates arising from the dry process material 202.

In the illustrated embodiment, the sealed processing equipment 212 may include a mixer 302 (or a location for the mixer 302) sized to receive the dry process material 202. The mixer 302 or the encapsulating structure of sealed processing equipment 212 may include a lid 304 configured to be sealed shut while mixing or otherwise processing the dry process materials 202. In at least one embodiment, the lid 304 may include clamping bars 306 for sealing the lid 304 shut. In other embodiments, however, the clamping bars 306 may be used to help facilitate the sealed connection 214 (FIG. 2) between the sealed container 208 (FIG. 2) and the sealed processing equipment 212.

The sealed processing equipment 212 may further include a sealed conveyor 308 extending from the mixer 302 and operable to transfer the dry process material 202 (FIG. 2) from the mixer 302 to a sealed hopper 310. In some embodiments, the transition between the mixer 302 and the conveyor 308 may include one or more moustache brushes 312 that help trap dust and particulates within the mixer 302 and/or the sealed conveyor 308 during operation.

In some embodiments, the sealed hopper 310 or the encapsulating structure of sealed processing equipment 212 may have a lid (not shown) capable of sealing the top (or one or more sides) of the sealed hopper 310. The sealed hopper 310 may be operable to feed the dry process material 202 (FIG. 2) into a sealed outlet 314, which may be fluidly coupled to the sealed transfer conduit 222 (FIG. 2). In at least one embodiment, the sealed outlet 314 may be the same structure as the sealed coupling 226 (FIG. 2) described above.

Embodiments disclosed herein include:

A. A system for preparing a dry process material that includes a sealed container that holds and seals the dry process material therein and prevents airborne dust or particles from the dry process material from escaping the sealed container, sealed processing equipment that receives the dry process material from the sealed container and prevents the airborne dust or particles from escaping the sealed processing equipment, a sealed connection that sealingly couples the sealed container to the sealed processing equipment and prevents the airborne dust or particles from escaping while transferring the dry process material, and a sealed transfer conduit sealingly coupled to and extending from the sealed processing equipment.

B. A method of preparing a dry process material that includes holding the dry process material within a sealed container that prevents airborne dust or particles from the dry process material from escaping, coupling the sealed container to sealed processing equipment with a sealed connection and transferring the dry process material from the sealed container to the sealed processing equipment via the sealed connection, preventing the airborne dust or particles from escaping with the sealed connection while transferring the dry process material, sealing the dry process material within the sealed processing equipment and thereby preventing the airborne dust or particles from escaping the sealed processing equipment, and transferring the dry process material to a sealed transfer conduit sealingly coupled to and extending from the sealed processing equipment.

Each of embodiments A and B may have one or more of the following additional elements in any combination: Element 1: wherein the dry process material is selected from the group consisting of a refractory material, a concrete mixture, a mortar mixture, a food product, a fertilizer, sand, a cosmetic powder, minerals, metals, grains, ceramic materials, and any combination thereof. Element 2: wherein the sealed container is made of a material selected from the group consisting of a plastic, a metal, a fabric, an elastomer, a composite material, silicone, graphite, paper, cardboard, and any combination thereof. Element 3: wherein the sealed container is hermetically sealed. Element 4: wherein the sealed connection comprises a first sealed coupling positioned on the sealed container, a second sealed coupling positioned on the sealed processing equipment, and a sealed conduit sealingly coupled to and extending between the first and second sealed couplings. Element 5: wherein the sealed conduit is selected from the group consisting of a hose, a pipe, a chute, a funnel, a conveyor belt, an auger, and any combination thereof. Element 6: further comprising a valve coupled one of the first or second sealed couplings and actuatable to initiate transfer of the dry process material through the sealed conduit. Element 7: wherein the sealed connection comprises a first sealed coupling positioned on the sealed container, and a second sealed coupling positioned on the sealed processing equipment and matable with the first sealed coupling to form a sealed engagement. Element 8: wherein the dry process material is transferred mechanically, pneumatically, or by gravity between the sealed container and the sealed processing equipment and via the sealed connection. Element 9: wherein the sealed processing equipment comprises equipment selected from the group consisting of a mixer, a hopper, a pump, a gunning machine, one or more transfer lines, a holding tank, and any combination thereof. Element 10: further comprising a nozzle coupled to an end of the sealed transfer conduit. Element 11: wherein the sealed transfer conduit is coupled to the sealed processing equipment at a sealed coupling providing a sealed interface that prevents the airborne dust or particles from escaping.

Element 12: wherein holding the dry process material within the sealed container is preceded by transporting the sealed container to a location where the sealed processing equipment is located, and sealing the dry process material within the sealed container during transport and thereby preventing the airborne dust or particles from escaping the sealed container. Element 13: wherein the sealed connection comprises a first sealed coupling positioned on the sealed container, a second sealed coupling positioned on the sealed processing equipment, and a sealed conduit extending between the first and second sealed couplings, the method further comprising sealingly coupling the sealed conduit to the first and second sealed couplings. Element 14: further comprising initiating transfer of the dry process material through the sealed conduit by actuating a valve coupled one of the first or second sealed couplings. Element 15: wherein the sealed connection comprises a first sealed coupling positioned on the sealed container, and a second sealed coupling positioned on the sealed processing equipment, the method further comprising mating the first and second sealed couplings and thereby forming a sealed engagement. Element 16: wherein transferring the dry process material from the sealed container to the sealed processing equipment comprises transferring the dry process material via at least one of mechanically, pneumatically, or by gravity. Element 17: wherein a nozzle is coupled to an end of the sealed transfer conduit, and the method further comprises discharging the dry process material from the nozzle. Element 18: further comprising sealingly coupling the sealed transfer conduit to the sealed processing equipment at a sealed coupling that prevents the airborne dust or particles from escaping.

By way of non-limiting example, exemplary combinations applicable to A and B include: Element 4 with Element 5; Element 4 with Element 6; and Element 13 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A system for preparing a dry process material, comprising:
  a sealed container that holds and seals the dry process material therein and prevents airborne dust or particles from the dry process material from escaping the sealed container;
  sealed processing equipment that receives the dry process material from the sealed container and prevents the airborne dust or particles from escaping the sealed processing equipment;
  a sealed connection that operably and sealingly couples the sealed container to the sealed processing equipment and prevents the airborne dust or particles from escaping while transferring the dry process material from the sealed container to the sealed processing equipment,
  wherein the sealed connection includes a first sealed coupling positioned on the sealed container, a second sealed coupling positioned on the sealed processing equipment, and a sealed conduit operably and sealingly coupled to and extending between the first and second sealed couplings,
  wherein the sealed conduit is releasably coupled to the first sealed coupling such that upon transfer of the dry process materials from the sealed container to the sealed processing equipment, the first sealed coupled can be decoupled from the sealed conduit such that another sealed contained having another first sealed coupling can be releasably coupled to the sealed conduit,
  wherein the sealed connection includes a valve coupled to one of the first or second sealed couplings and actuatable to initiate transfer of the dry process material through the sealed conduit; and
  a sealed transfer conduit sealingly coupled to and extending from the sealed processing equipment, wherein the sealed transfer conduit is coupled to the sealed processing equipment at a sealed coupling providing a sealed interface that prevents the airborne dust or particles from escaping while transferring the dry process material.

2. The system of claim 1, wherein the dry process material is selected from the group consisting of a refractory material, a concrete mixture, a mortar mixture, a food product, a fertilizer, sand, a cosmetic powder, minerals, metals, grains, ceramic materials, and any combination thereof.

3. The system of claim 1, wherein the sealed container is made of a material selected from the group consisting of a plastic, a metal, a fabric, an elastomer, a composite material, silicone, graphite, paper, cardboard, and any combination thereof.

4. The system of claim 1, wherein the sealed container is hermetically sealed.

5. The system of claim 1, wherein the sealed conduit is selected from the group consisting of a hose, a pipe, a chute, a funnel, a conveyor belt, an auger, and any combination thereof.

6. The system of claim 1, wherein the dry process material is transferred mechanically, pneumatically, or by gravity between the sealed container and the sealed processing equipment and via the sealed connection.

7. The system of claim 1, wherein the sealed processing equipment comprises equipment selected from the group consisting of a mixer, a hopper, a pump, a gunning machine, one or more transfer lines, a holding tank, and any combination thereof.

8. The system of claim 1, further comprising a nozzle coupled to an end of the sealed transfer conduit.

\* \* \* \* \*